United States Patent
Tadmor

(10) Patent No.: US 12,123,952 B2
(45) Date of Patent: Oct. 22, 2024

(54) IMAGING SYSTEM WITH TIME-OF-FLIGHT SENSING

(71) Applicant: SEMICONDUCTOR COMPONENTS INDUSTRIES, LLC, Phoenix, AZ (US)

(72) Inventor: Erez Tadmor, Atlit (IL)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 968 days.

(21) Appl. No.: 17/134,726

(22) Filed: Dec. 28, 2020

(65) Prior Publication Data

US 2021/0333404 A1    Oct. 28, 2021

Related U.S. Application Data

(60) Provisional application No. 63/015,756, filed on Apr. 27, 2020.

(51) Int. Cl.
  *G01S 17/894* (2020.01)
  *G01S 7/4865* (2020.01)
  *H04N 23/73* (2023.01)

(52) U.S. Cl.
  CPC .......... *G01S 17/894* (2020.01); *G01S 7/4865* (2013.01); *H04N 23/73* (2023.01)

(58) Field of Classification Search
  None
  See application file for complete search history.

(56) References Cited

U.S. PATENT DOCUMENTS

| | | | |
|---|---|---|---|
| 2013/0181119 A1* | 7/2013 | Bikumandla | G01S 7/4865 250/214.1 |
| 2013/0235160 A1 | 9/2013 | Cohen et al. | |
| 2015/0109414 A1 | 4/2015 | Adam et al. | |
| 2015/0144790 A1* | 5/2015 | Velichko | G01S 17/894 250/338.4 |
| 2019/0181169 A1 | 6/2019 | Tadmor et al. | |
| 2020/0007850 A1 | 1/2020 | Nieuwenhove et al. | |
| 2021/0356598 A1* | 11/2021 | Hurwitz | G01S 7/4861 |

FOREIGN PATENT DOCUMENTS

DE   102012223295 A1   6/2014

* cited by examiner

*Primary Examiner* — Luke D Ratcliffe
(74) *Attorney, Agent, or Firm* — Treyz Law Group, P.C.; Tianyi He

(57) ABSTRACT

A time-of-flight (TOF) sensing system may include an illumination module and a sensor module. The illumination module may emit light having a reduced illumination duty cycle such as a high peak power and low width illumination pulse. The emitted light may reflect off of one or more objects as reflected light. The sensor module may include pixels operable based on a sensor modulation signal to generated image charge portions in response to the reflected light. The sensor modulation signal may be selectively suppressed after a period of time corresponding to a distance of interest. Processing circuitry in the TOF sensing system may obtain TOF information based on a phase difference between the emitted light and the image charge portions determined by cross-correlation data. By using the illumination pulse and the selective sensor modulation suppression, TOF sensing may exhibit reduced aliasing issues and improved ambient light rejection.

20 Claims, 4 Drawing Sheets

IMAGING SYSTEM WITH TIME-OF-FLIGHT SENSING

This application claims the benefit of U.S. provisional patent application No. 63/015,756, filed on Apr. 27, 2020, which is incorporated by reference herein in its entirety.

BACKGROUND

This relates generally to imaging systems and more specifically to camera modules having time-of-flight (TOF) sensing capabilities.

A typical TOF sensor includes an illumination module and a sensor module. The illumination module emits light onto an image scene having one or more objects. The emitted light reflects off of the one or more objects and is received by pixels in the sensor module to generate corresponding electrical charge. Based on the received light (e.g., the generated electrical charge), the sensor module can perform time-of-flight sensing calculations or operations to determine depth and other scene information.

In the illustrative example of indirect TOF sensing, the illumination module can emit light having a specific modulation frequency. The reflected light, when received by the sensor module, can have the same modulation frequency with a phase delay (e.g., a time delay) relative to the emitted light indicative of a distance traveled by the emitted and reflected light. The sensor module can determine the phase delay based on the generated image data and can therefore determine depth and other scene information, which are correlated with the determined phase delay.

However, this type of indirect TOF sensing and processing can suffer from issues such as aliasing or depth ambiguity issues (e.g., resulting from the harmonic or repetitive nature of the emitted light reaching and reflected from different objects in the scene), ambient light saturation issues (e.g., resulting from the continual gathering of ambient light charge), and ambient light shot noise issues (e.g., resulting from the inability to remove such noise once ambient light charge has been collected at the pixel level).

It is within this context that the embodiments herein arise.

DETAILED DESCRIPTION

Electronic systems such as digital cameras, computers, cellular telephones, automotive systems, and other electronic systems may include imaging systems or modules that gather light (photons) to capture one or more images (one or more image frames) that include information about their surrounding environments (e.g., the image scenes). The imaging system may have sensor circuitry including one or more arrays of image sensor pixels (sometimes referred to herein as sensor pixels or pixels). The active pixels in the array may include photosensitive elements such as pinned photodiodes that convert the incoming light into electric charge. The array may have any number of pixels (e.g., hundreds or thousands or more). Sensor circuitry may include control circuitry such as circuitry for controlling the pixels and readout circuitry for reading out image signals corresponding to the electric charge generated by the photosensitive elements.

Figure 1:
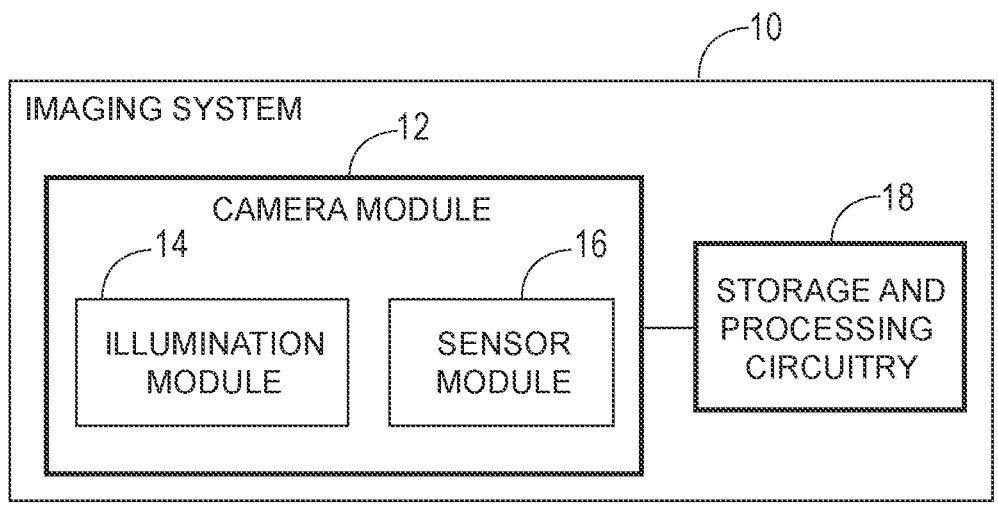
FIG. 1 is a diagram of an illustrative imaging system having a time-of-flight sensor in accordance with some embodiments.

FIG. 1 is a diagram of an illustrative imaging system such as an electronic device that uses sensor circuitry (sometimes referred to herein as a sensor module) to capture images. Imaging system 10 of FIG. 1 may be a stand-alone camera, a cellular telephone, a tablet computer, a webcam, a video camera, a video surveillance system, an automotive imaging system, a video gaming system with imaging capabilities, an augmented reality and/or virtual reality system, an unmanned aerial vehicle system (e.g., a drone), an industrial system, or any other desired imaging system or device that captures image data. Camera module 12 (sometimes referred to as an imaging module or image sensor) may be used to convert incoming light into digital image data. Camera module 12 may one or more corresponding sensor modules 16. During image capture operations, light from a scene may be focused onto sensor module 16 by one or more corresponding lenses. Sensor module 16 may include circuitry for generating analog pixel image signals and circuitry for converting analog pixel image signals into corresponding digital image data, as examples. The digital image data may be provided to storage and processing circuitry 18.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12. When storage and processing circuitry 18 is implemented on different integrated circuits than those implementing camera module 12, the integrated circuits with circuitry 18 may be vertically stacked or packaged with the integrated circuits for camera module 12. Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, an external display, or other devices) using wired and/or wireless communications paths coupled to processing circuitry 18.

In some illustrative configurations described herein as examples, camera module 12 may implement a time-of-flight (TOF) sensor or camera. In these configurations, camera module 12 may include illumination module 14 configured to emit light for illuminating an image scene (e.g., one or more objects in the image scene), and sensor module 16 may be configured to gather reflected versions of the emitted light and to generate TOF information for the image scene (e.g., depth or distance information for one or more of the objects, a depth or distance map of the image scene, an image of the image scene, other information indicative of TOF information, etc.). Additional details for implementing the specific features of such TOF sensing systems are described below.

Figure 2:
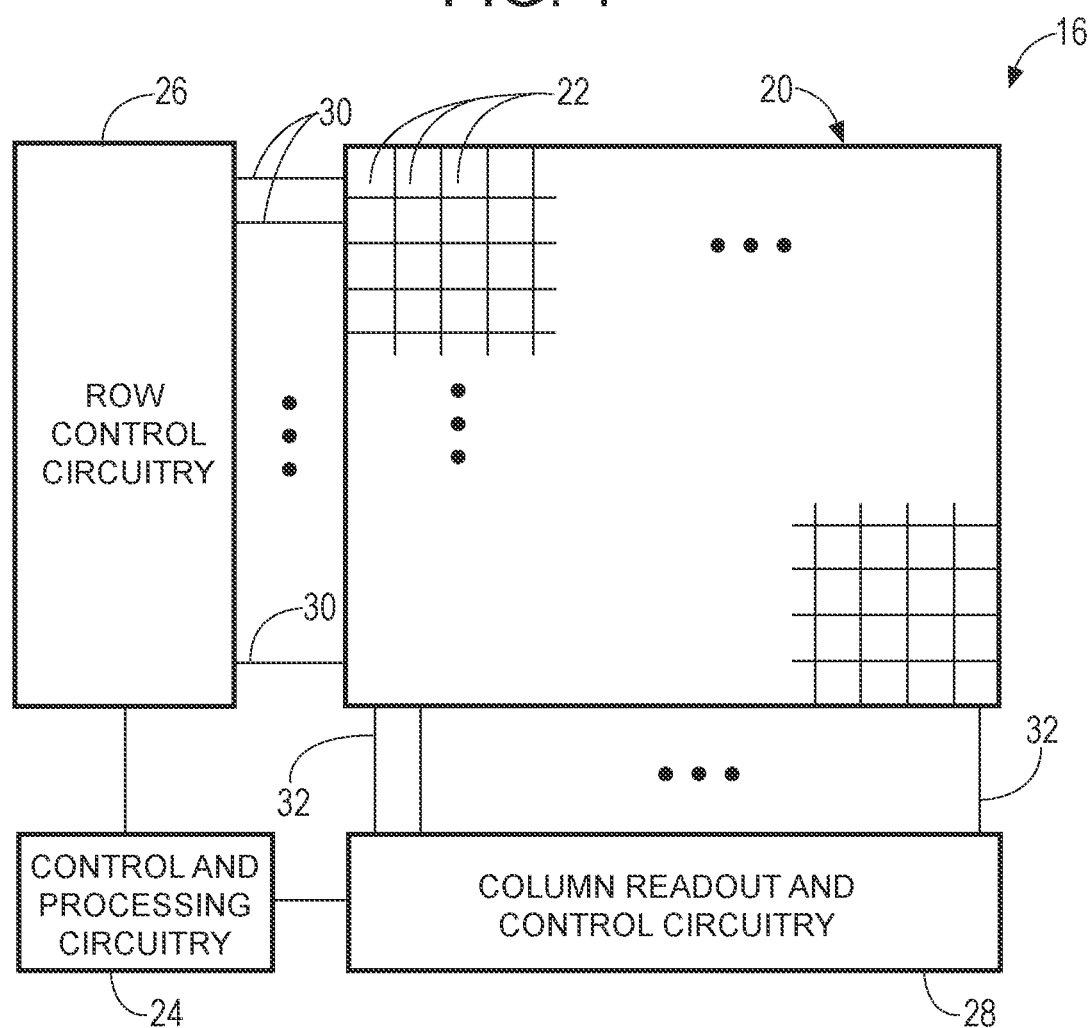
FIG. 2 is a diagram of illustrative sensor circuitry having a pixel array and corresponding control and readout circuitry in accordance with some embodiments.

As shown in FIG. 2, sensor module 16 (e.g., in TOF sensor 12 in FIG. 1) may include a pixel array 20 containing sensor pixels 22 arranged in rows and columns and control and processing circuitry 24. Array 20 may contain, for example, tens, hundreds, or thousands of rows and columns of sensor pixels 22. Control circuitry 24 may be coupled to row control circuitry 26 (sometimes referred to as row driver circuitry or pixel driver circuitry) and column readout and control circuitry 28 (sometimes referred to as column readout circuitry or column control circuitry, readout circuitry, or column decoder circuitry). Row control circuitry 26 may receive row addresses from control circuitry 24 and supply corresponding row control signals such as reset, anti-blooming, row select (or pixel select), modulation, storage, charge transfer, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and an image signal generated by each corresponding image pixel 22 in that pixel row can be read out along a respective column line 32.

Column readout circuitry 28 may receive image signals (e.g., analog pixel values generated by pixels 22) over column lines 32. Column readout circuitry 28 may include memory circuitry for temporarily storing calibration signals (e.g., reset level signals, reference level signals) and/or image signals (e.g., image level signals) read out from array 20, amplifier circuitry or a multiplier circuit, analog to digital conversion (ADC) circuitry, bias circuitry, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Column readout circuitry 28 may supply digital pixel data to control and processing circuitry 24 and/or processor 18 (FIG. 1) for pixels in one or more pixel columns.

If desired, pixel array 20 may also be provided with a filter array having multiple (color) filter elements (each corresponding to a respective pixel) which allows a single image sensor to sample light of different colors or sets of wavelengths. In general, filter elements of any desired color and/or wavelength (e.g., infrared wavelengths) and in any desired pattern may be formed over any desired number of image pixels 22. In the illustrative example of time-of-flight sensing using an illumination source, pixel array 20 may be provided with a correspond filter array that passes light having colors and/or frequencies emitted from the illumination source.

Sensor module 16 may include one or more arrays 20 of image pixels 22. Image pixels 22 may be formed in a semiconductor substrate using complementary metal-oxide-semiconductor (CMOS) technology or charge-coupled device (CCD) technology or any other suitable photosensitive devices technology. Image pixels 22 may be frontside illumination (FSI) image pixels or backside illumination (BSI) image pixels. If desired, array 20 may include pixels 22 of different types such as active pixels, optically shielded pixels, reference pixels, etc. If desired, sensor module 16 may include an integrated circuit package or other structure in which multiple integrated circuit substrate layers or chips are vertically stacked with respect to each other.

Configurations in which TOF sensor 12 (FIG. 1) is configured to perform indirect TOF measurements based on phase differences between a modulated light signal (emitted by illumination module 14 in FIG. 1) and the reflected modulated light signal from an object in an image scene (received by sensor module 16 in FIG. 2) are described herein for illustrative purposes. In these configurations, sensor module 16 may include an array of "lock-in" active pixels 22, each configured to demodulate the received light signal based on a sensor modulation frequency to generate corresponding charge portions useable to generate TOF information.

Figure 3:
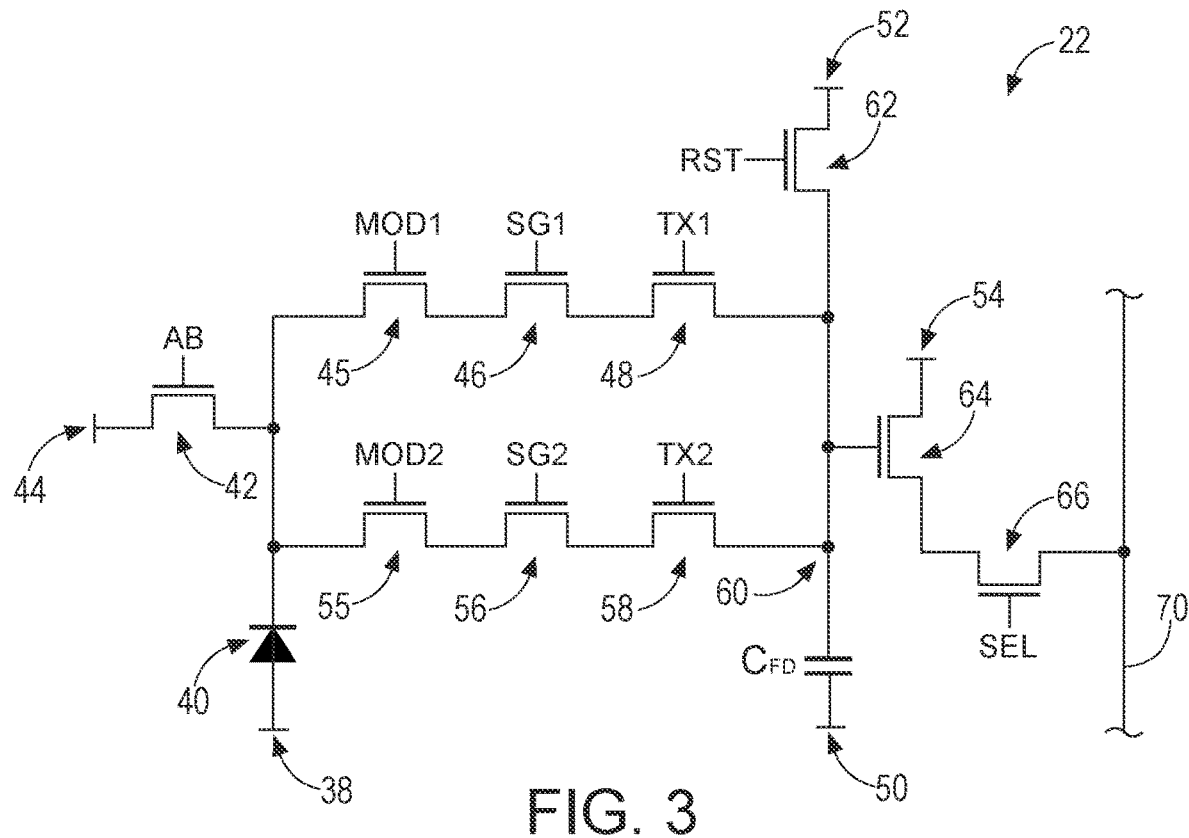
FIG. 3 is a circuit diagram of an illustrative sensor pixel in accordance with some embodiments.

FIG. 3 is a circuit diagram of an illustrative image sensor pixel 22 (e.g. implementing each lock-in pixel 22 forming array 20 in FIG. 2). Pixel 22 may include photosensitive element 40 (e.g., photodiode 40). Photodiode 40 may receive incident light over a period of time (e.g., an integration time period) and may generate electric charge based on the incident light. A first terminal of photodiode 40 may be coupled to a voltage terminal 38 such as a ground voltage source. An anti-blooming transistor 42 may couple photodiode 40 (e.g., a second terminal of photodiode 40) to a voltage terminal 44 such as a supply voltage source. Transistor 42 may be configured to prevent blooming at photodiode 40 and/or may serve to keep photodiode 40 at a reset voltage level (e.g., the supply voltage level). As an example, when control signal AB is asserted (e.g., at a logic high to turn on transistor 42), photodiode 40 may be reset to the supply voltage level. When control signal AB is deasserted (e.g., at a logic low to turn off transistor 42), photodiode 40 may begin to accumulate charge in response to incident light.

Pixel 22 may include (local) charge storage regions such as storage gates 46 and 56. As an example, each storage gate may include a corresponding adjustable charge transfer barrier portion and a corresponding charge storage portion over which the gate terminal is formed. In other words, control signals SG1 and SG2 may be adjusted to control the flow of charge from photodiode 40 into the charge storage regions associated with storage gates 46 and 56, respectively. The use of storage gates in pixel 22 is merely illustrative. If desired, any suitable types of charge storage regions may be used in pixel 22.

Transistors 45 and 55 may couple photodiode 40 to storage gates 46 and 56, respectively. Control signals MOD1 and MOD2 may be used to active transistors 45 and 55, respectively, and may be used to selectively transfer charge generated by photodiode 40 to one of storage gates 46 or 56 during the integration time period. As an example, control signals MOD1 and MOD2 may be inverted versions of each other during the integration time period. As such, at most only one of transistors 45 or 55 may be activated at a given time, thereby separating image charge generated at photodiode 40 into first and second charge portions stored at storage gates 46 and 56, respectively, depending on the time periods during which respective signals MOD1 and MOD2 are asserted (e.g., depending on a sensor modulation signal based on which pixel 22 or sensor module 16 is modulated).

Pixel 22 may include floating diffusion region 60 having an associated charge storage capacity (e.g., having capacitance $C_{FD}$ relative to voltage terminal 50). As an example, floating diffusion region 60 may be implemented as a doped semiconductor region (e.g., a region in a silicon substrate that is doped by ion plantation, impurity diffusion, or other doping processes). Storage gates 46 and 56 may temporarily store (portions of) image charge generated at photodiode 40 prior to transferring the stored portions of image charge to floating diffusion region 60 for readout.

Transfer transistors 48 and 58 may respectively couple storage gates 46 and 56 to floating diffusion region 60. During readout operations, each transfer transistor (when activated by control signals TX1 or TX2) may transfer a charge portion stored at the corresponding storage gate to floating diffusion region 60 for readout. A reset transistor 62 may couple floating diffusion region 60 to a voltage terminal 52 such as a supply voltage source. As an example, when control signal RST is asserted, floating diffusion region 60 may be reset to a reset voltage level (e.g., the supply voltage level). If desired, transistor 62 (in combination with other transistors) may be used to reset other portions of pixel 22 (e.g., storage gates 46 and 56 using transistors 48 and 58) to the reset voltage level.

Pixel 22 may include source follower transistor 64 and row select transistor 66 (sometimes collectively referred to herein as pixel readout circuitry). Source follower transistor 64 has a gate terminal coupled to floating diffusion region 60, a first source-drain terminal (e.g., one of a source or drain terminal) coupled to voltage terminal 54 (e.g., a supply voltage source), and a second source-drain terminal (e.g., the other one of the source or drain terminal) coupled to row select transistor 66. Transistor 66 may have a gate terminal that is controlled by row select control signal SEL. When control signal SEL is asserted (e.g., during a pixel readout operation when reset and/or image level signals from one or more pixels are being read out), a pixel output signal may be passed onto path 70 (e.g., column line 32 in FIG. 2). The pixel output signal may be an output signal having a magnitude that is proportional to the amount of charge at floating diffusion region 60.

The configuration of pixel 22 shown in FIG. 3 is merely illustrative. If desired, pixel 22 in FIG. 3 may include one or more suitable additional elements (e.g., elements analogous to transistors 45 and 48, and storage gate 46 along one or more additional parallel paths between photodiode 40 and floating diffusion region 60, etc.), may exclude one or more suitable elements, and/or may replace one or more suitable elements (e.g., replace storage gates 46 and 56 with other types of charge storage structures, etc.). If desired, any of the voltage terminals in pixel 22 may be coupled to a variable voltage source or a fixed voltage source.

Configurations in which an image sensor pixel array such as array 20 in FIG. 2 includes pixels 22 each having the implementation of pixel 22 shown in FIG. 3 are described herein as illustrative examples. If desired, the embodiments described herein may similarly apply to an array having pixels of other implementations. In general, any suitable configuration for a lock-in pixel or any other suitable types of (indirect) TOF sensing pixels may be used.

Figure 4:
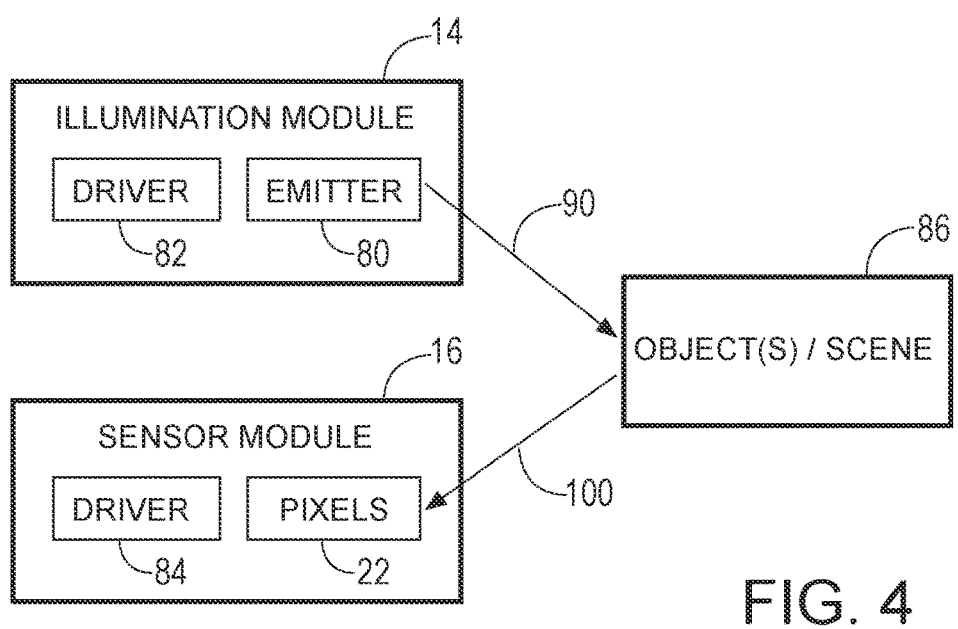
FIG. 4 is a diagram of light emitted from an illumination module and light reflected from one or more objects that is collected by a sensor module in accordance with some embodiments.

FIG. 4 is an illustrative diagram showing how illumination module 14 may emit light and how sensor module 16 may receive the corresponding reflected light (e.g., the emitted light after reflecting off of one or more objects). As shown in FIG. 4, illumination module 14 may include an emitter 80 coupled to driver circuitry 82 (sometimes referred to as controller circuitry 82) for emitter 80. Emitter 80 (sometimes referred to herein as a light source, a light emitter) may be implemented using and may include one or more light emitting diodes (LEDs), one or more laser diodes, one or more lasers, and/or one or more of other suitable light or illumination sources. Emitter 80 may be controlled by one or more control, clock, and/or modulation signals from driver circuitry 82. As an example, one or more (modulation) signals from driver circuitry 82 may control emitter 80 to emit light having a sinusoidal pattern or waveform and to exhibit the desired illumination characteristics such as a desirable modulation frequency, a desirable modulated amplitude, etc. As another example, one or more (control and clock) signals from driver circuitry 82 may control emitter 80 to periodically emit short pulses of light and to exhibit the desired illumination characteristics such as a desired peak power for each of the pulses, a suitable time period between adjacent pulses or a suitable pulse frequency, etc.

Controlled by driver circuitry 82, emitter 80 may emit light 90 having any suitable characteristics (e.g., any suitable waveform, any suitable peak amplitude or power, any suitable periodicity or frequency, etc.). Light 90 may reach one or more objects 86 in an image scene and reflect off one or more objects 86 as reflected light 100. Objects 86 may include any suitable objects, inanimate or animate.

Reflected light 100 may be received at one or more (active) pixels 22 in sensor module 16. Sensor module 16 may also include driver circuitry 84 (e.g., in row control circuitry 26 in FIG. 2, in control and processing circuitry 24 in FIG. 2, etc.) coupled to pixels 22. As an example, driver circuitry 84 may provide control signals to control the operations of pixels 22 (e.g., provide corresponding control signals coupled to transistors or other actuated elements in pixels 22). In particular, based on the received control signals from driver circuitry 84, pixels 22 may generate different portions of charge in response to reflected light 100 (e.g., during an integration time period), may perform readout operations on the generated portions of charge (e.g., during a readout time period), and may perform other suitable operations during other time periods.

In some configurations where illumination module 14 and sensor module 16 operate in an indirect TOF sensing scheme using lock-in pixels 22, driver circuitry 82 may provide a modulation signal to emitter 80 to emit light signal 90 having a given modulation frequency, and reflected light 100 may have the same modulation frequency with a phase delay corresponding to the distance of object 86 off of which light signal 100 is reflected. In these configurations, sensor module 16 may be operated based on the given modulation frequency. As an example, driver circuitry 84 may receive a sensor modulation signal having the given modulation frequency and may control pixels 22 based on the sensor modulation signal and the given modulation frequency. Based on the sensor modulation (using the modulation signal), each pixel 22 may be controlled to generate and store multiple portions of charge (e.g., at storage gates 46 and 56 in FIG. 3) in response to received light signal 100. Each pixel 22 may thereby be used to generate cross-correlation data useable to generate TOF information about the scene.

The TOF sensing system in FIG. 4 is merely illustrative. Illumination module 14 and sensor module 16 may each include any other suitable circuitry (e.g., power supply circuitry, processing circuitry, control circuitry, readout circuitry, timing circuitry, clock circuitry, etc.). While illumination module 14 and sensor module 16 are shown as completely separate modules in FIG. 4 (and in FIG. 1), this is merely illustrative. If desired, illumination module 14 and sensor module 16 may be coupled to and include shared circuitry in the camera module system (e.g., power supply circuitry, clock generation circuitry, a timing controller, signal generator circuitry, control circuitry, storage circuitry, etc.), and may operate in close connection with each other.

Figure 5:
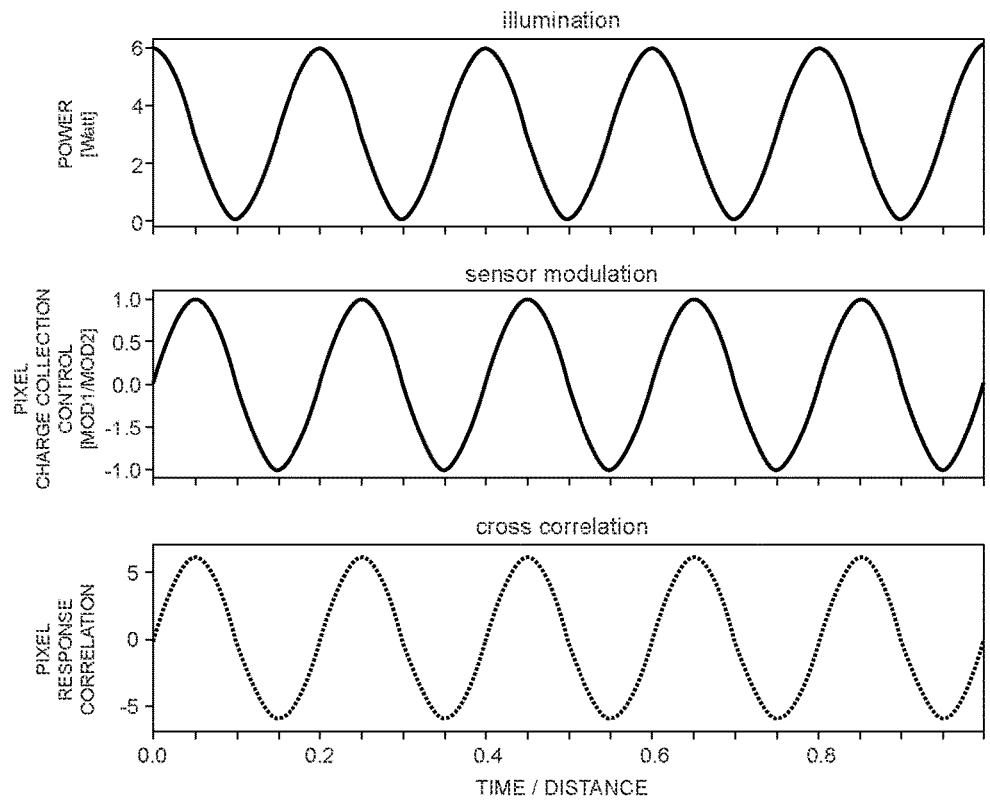
FIG. 5 is a diagram of illustrative illumination characteristics of an illumination module, illustrative sensor modulation characteristics of a sensor module, and illustrative cross-correlation characteristics used to determine time-of-flight information in accordance with some embodiments.

FIG. 5 is an illustrative diagram showing different signal characteristics of different signals in an illustrative TOF sensing system (e.g., the system shown in FIG. 4). The top plot of FIG. 5 shows the power characteristics of an illumination signal (e.g., light signal 90 in FIG. 4) over time (e.g., also over distance as the illumination signal propagates through time). The illumination signal in FIG. 5 may exhibit a sinusoidal waveform having a modulated amplitude and a corresponding modulation frequency. As an example, driver circuitry 82 in FIG. 4 may provide a corresponding modulation signal to modulate the amplitude of the illumination signal and control the illumination to exhibit the modulation frequency, thereby controlling illumination module 14 to provide the illumination signal in FIG. 5. While, in the example of FIG. 5, the illumination signal exhibits a power between 0 W and 6 W, this is merely illustrative.

The middle plot of FIG. 5 shows the sensor or pixel modulation characteristics of a sensor modulation signal (e.g., a sensor modulation signal received by driver circuitry 84 in FIG. 4, a sensor module modulation signal used by driver circuitry 84 to generate control signals for controlling pixels 22 in FIG. 4) over time. The sensor modulation signal in FIG. 5 may exhibit a sinusoidal waveform having the same modulation frequency as the illumination signal. As an example, driver circuitry 84 in FIG. 4 may receive the sensor modulation signal and may generate control signals for each pixel 22 based on the sensor modulation signal. In particular, the sensor modulation signal may be used to selective assert and deassert control signals MOD1 and MOD2 for each pixel 22 (FIG. 3), thereby controlling the charge collection and storage at different storage regions (e.g., storage gates 46 and 56 in FIG. 3) in each pixel 22. The different charge portions separated by control signals MOD1 and MOD2 may separately read out and used to identify (e.g., calculate) the corresponding phase difference between the illumination signal and the reflected signal received by sensor module, and consequently, the corresponding TOF information may also be identified (e.g., calculated).

The bottom plot of FIG. 5 shows the pixel response correlation characteristics of the corresponding cross-correlation data or signal (e.g., between the illumination signal and the sensor signal generated based on the sensor modulation and calculated from the different signal readout operations from each pixel 22) over time (e.g., over distance traveled by light signals 90 and 100). In other words, based on the sensor modulation signal (e.g., controlling pixel 22 to output corresponding signals during different readouts) and the illumination signal in FIG. 5, processing circuitry for the camera module (e.g., processing circuitry 24 in FIG. 2 or processing circuitry 18 in FIG. 1) may generate the cross-correlation data in FIG. 5. In particular, at the maximum pixel response correlation, the sensor-generated signal indicative of the reflected light may correlate best with the illumination signal. As such, based on the peaks of pixel response correlation, the processing circuitry may identify and determine the phase difference between the illumination light and the reflected light, and may consequently determine TOF (e.g., distance or depth) information.

While in the example of FIG. 5 the illumination signal emitted may be a modulated sinusoidal signal, it may be desirable to provide illumination signals having other characteristics. In particular, it is often impractical to create a harmonically-modulated illumination signal, and accordingly, such illumination systems may not be as readily available as illumination systems of other types. As such, an illumination module such as illumination module 14 in FIG. 4 may be configured to emit light 90 having other characteristics.

Figure 6:
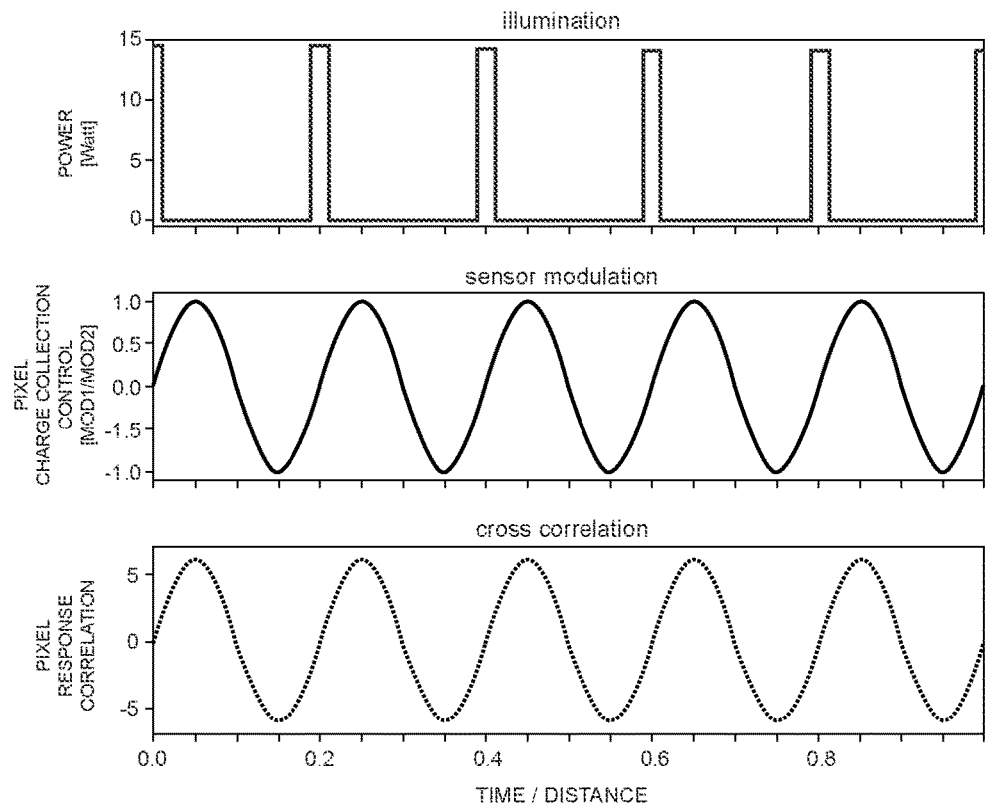
FIG. 6 is a diagram of illustrative illumination characteristics having periodic narrow pulses with low duty cycle, illustrative sensor modulation characteristics, and illustrative cross-correlation characteristics in accordance with some embodiments.

FIG. 6 is an illustrative diagram showing an illumination signal having periodic illumination pulses that may be implemented by an illustrative TOF sensing system (e.g., the system shown in FIG. 4). In the example of FIG. 6, the sensor modulation signal in the middle plot may remain the same as (e.g., have the same characteristics as) the sensor modulation signal in FIG. 5. However, as shown in FIG. 6, the illumination signal in the top plot may exhibit narrow pulses of relatively high power (compared to the peak power in the illumination signal of FIG. 5). As an example, driver circuitry 82 (FIG. 4) may control emitter 80 may exhibit narrow width pulses of light having a regular periodicity (e.g., having a regular pulse frequency).

As shown in FIG. 6, due the narrow width of the pulses in the illumination signal, the illumination signal may be associated with a corresponding low or reduced duty cycle such as a duty cycle of less than 20%, less than 10%, less than 5%, less than 1%, or any other suitable duty cycle. Accordingly, control or drive signals provided by driver circuitry 82 and received by emitter 84 (FIG. 4) to exhibit the illumination signal of FIG. 6 may similarly have a corresponding low or reduced duty cycle. Additionally, the illumination signal in FIG. 6, exhibiting an increased peak power of 15 W instead of 6 W exhibited by the illumination signal of FIG. 5, may still have the same total illumination power as the illumination signal of FIG. 5. Advantageously, with a short enough of a pulse width for each of the pulses while maintaining the same total illumination power as the illumination signal in FIG. 5 (e.g., illumination signals normalized with respect to each other), the distortion on the cross-correlation data (e.g., the difference between the cross-correlation data in FIG. 6 compared to in FIG. 5) is minimal. In other words, the illustrative TOF sensing system implementing the illumination and sensor modulation characteristics of FIG. 6 can effectively have (almost) the same cross-correlation characteristics (e.g., the same cross-correlation plot) as the illustrative TOF sensing system implementing the illumination and sensor modulation characteristics of FIG. 5.

While in the example of FIG. 6, the periodicity or frequency of the illumination pulses (e.g., the pulse frequency in the illumination signal) may be the same as that of the sensor modulation signal, this is merely illustrative. If desired, the illumination signal may exhibit periodic pulses that are less frequent than those shown in FIG. 6. As a particular example, every other pulse in the illumination signal of FIG. 6 may be omitted. In these scenarios where one or more pulses are omitted, the peak power may be increased accordingly to keep the total illumination power the same and maintain normalization (e.g., if every other pulse is omitted, the peak power of the remain pulses may be approximately doubled). By keeping the total illumination power consistent, maintaining narrow pulse widths, and using the same sensor modulation signal as in FIGS. 5 and 6, each of these illustrative TOF sensing system (e.g., implementing an illumination pulse frequency less than a sensor modulation frequency) can maintain the same cross-correlation characteristics (as shown in FIGS. 5 and 6).

Figure 7:
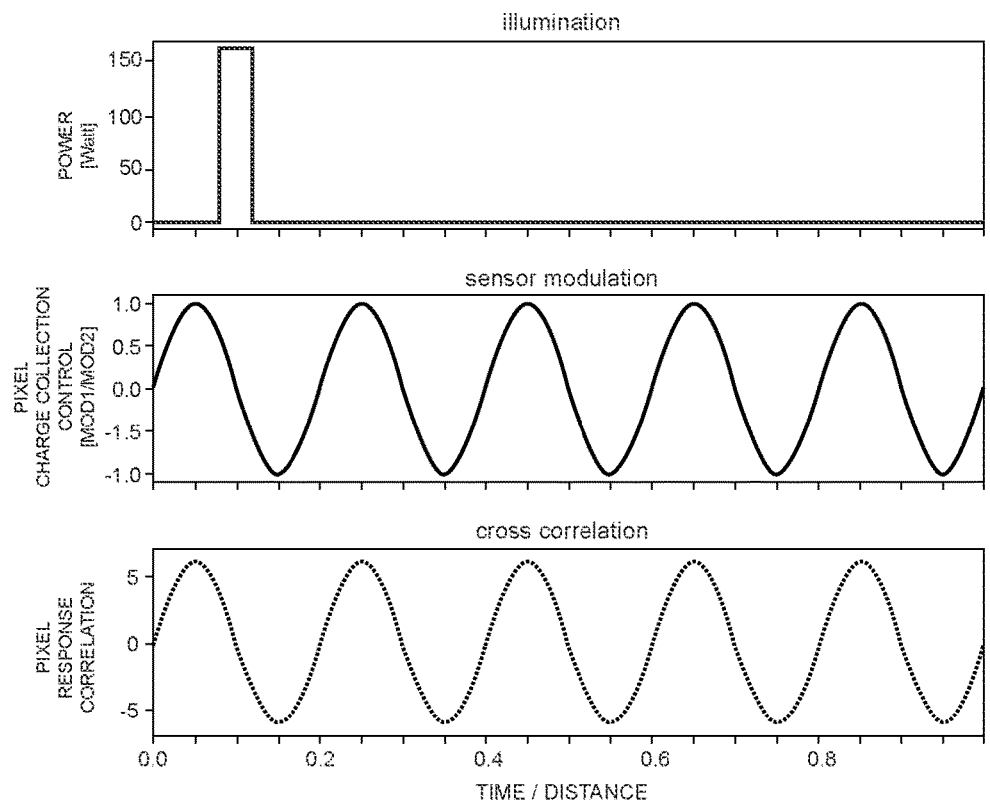
FIG. 7 is a diagram of illustrative illumination characteristics having a single high peak power pulse with low duty cycle, illustrative sensor modulation characteristics, and illustrative cross-correlation characteristics in accordance with some embodiments.

In the most extreme case, the periodic pulses in the illumination signal of FIG. 6 for a single TOF sensing operation may be replaced by a single strong pulse for the single TOF sensing operation (e.g., every pulse in the illumination signal shown in FIG. 6 may be omitted except one). FIG. 7 is an illustrative diagram showing an illumination signal exhibiting a single pulse for each TOF sensing operation that may be implemented by an illustrative TOF sensing system (e.g., the system shown in FIG. 4). In the example of FIG. 7, the sensor modulation signal in the middle plot may remain the same as (e.g., have the same characteristics as) the sensor modulation signals in FIGS. 5 and 6. To keep total illumination power consistent, the single pulse in the illumination signal of FIG. 7 may exhibit a relatively large peak power (e.g., 150 W compared to 15 W in the example of FIG. 6). This may help in keeping the cross-correlation characteristics in the bottom plot of FIG. 7 almost (or effectively) identical to the cross-correlation characteristics in the bottom plots of FIGS. 5 and 6.

As an illustrative example, the system in FIG. 4 may use (or exhibit) signals having characteristics described in connection with FIG. 7. In particular, driver circuitry 82 may control emitter 80 to generate and emit an illumination signal having a single illumination pulse (e.g., having a large peak power and a relatively low pulse width or duty cycle) for each TOF sensing operation (involving any number of suitable readout operations of corresponding charge portions at each pixel 22 to generate one set of corresponding TOF information about the scene). Driver circuitry 84 may receive a sensor modulation signal having a modulation frequency and may generate control signals for pixels 22 based on the sensor modulation signal.

As an example, driver circuitry 84 may assert and deassert control signals MOD1 and MOD2 in FIG. 3 based on the sensor modulation signal or the method frequency to split photodiode-generated charge between storage gates 46 and 56 in FIG. 3. Based on the different charge portions, each pixel 22 may generate a set of image signals (corresponding to the different charge portions collected during different phases of the modulation signal). Downstream readout circuitry and/or processing circuitry (e.g., readout circuitry 28 and processing circuitry 24 in FIG. 2) may be coupled to pixels 22 in FIG. 4 may determine the cross-correction data in the bottom plot of FIG. 7 using the image signals output by pixels 22. Accordingly, the processing circuitry may also identify a phase difference and consequently the depth or distance of a target object (and similar properties for additional objects) based on the cross-correlation data.

While keeping the cross-correlation characteristics effectively the same (relative to scenarios in which the different illumination signals of FIGS. 5 and 6 are used), a TOF sensing system employing signals having characteristics shown in FIG. 7 may exhibit a number of advantages. As mentioned above, illumination modules that produce narrow and strong pulses (e.g., the pulse in the illumination signal of FIG. 7) at lower (pulse) frequencies, and at lower duty cycles are more readily available than illumination modules that can operate with high modulation frequencies and that exhibit perfect sinusoidal behavior. Consequently, the illustrative TOF sensing system employing the illumination signal configuration of FIG. 7 can be more readily constructed and can behave relatively predictably.

Furthermore, the illustrative TOF sensing system employing the illumination signal configuration of FIG. 7 may help suppress or reduce aliasing issues (relative to those that employ the configurations of FIG. 5 or 6). In particular, due to the harmonic or periodic nature of the modulated light being emitted by the illumination module with any given TOF sensing operation (e.g., in the configurations of FIG. 5 or 6), each calculated phase difference can represent a set of different depths or distances, each a full wavelength apart. While the use of another lower frequency modulated light signal may help reduce these issues. At some point, the use of the lower frequency modulated light signal can also be aliased.

Take as an illustrative example the configuration of FIG. 6, which can illustrate this aliasing issues. As shown in FIG. 6, the illumination signal includes a series of pulses (e.g., a first pulse, a second pulse, . . . ). Because the pulses occur in a periodic manner, each point in the cross-correlation data in FIG. 6 may be correlated with (e.g., may originate from) any number of the different pulses prior to it (each indicative of a different distance traveled by that pulse). In such a manner, a highly reflective target object at a long distance may contribute significantly to the pixel response and may be interpreted as a target object that is nearby.

Advantageously, the illustrative TOF sensing system employing the illumination signal configuration of FIG. 7 resolves the above-mentioned ambiguity contributing to aliasing by providing only a single pulse for each TOF sensing operation. Additionally, the illustrative TOF sensing system may suppress the sensor modulation signal (e.g., suppress or stop sensor modulation) after a given time period (e.g., beyond a distance of interest traveled by the illumination pulse), thereby removing aliasing from the objects beyond the distance of interest. In other words, each point in the corresponding generated cross-correlation data may correlate with (e.g., may originate from) only the single illumination pulse and based on objects within the distance of interest. This helps to prevent aliasing issues resulting from reflected light from objects beyond the distance of interest.

Moreover, the illustrative TOF sensing system employing the illumination signal configuration of FIG. 7 (e.g., having a reduced duty cycle and an increased peak power associated with a single illumination pulse) may also improve ambient light resistance or ambient light rejection. In particular, as described above, by using the single illumination pulse configuration of FIG. 7, the illustrative TOF sensing system may also selectively suppress the sensor modulation for light returning from distances beyond the distance of interest (e.g., set a shortened integration time period for TOF sensing). Doing so not only allows the illustrative TOF sensing system to reduce aliasing effects from longer distances but also allows the sensor to reduce the amount of overall incident ambient light integrated at pixels 22.

While some systems may remove ambient light from the pixel after the ambient light has been integrated by pixels (e.g., by using some control or reference signal subtraction after pixel readout), these systems cannot also remove the corresponding ambient light photon shot noise in the already-integrated ambient light charge. As such, the illustrative TOF sensing system employing the illumination signal configuration of FIG. 7 and selectively suppressing sensor modulation is more advantageous than these systems (e.g., employing reference light subtraction) by integrating less overall ambient light charge and inherently reducing the corresponding ambient light photon shot noise.

Figure 8:
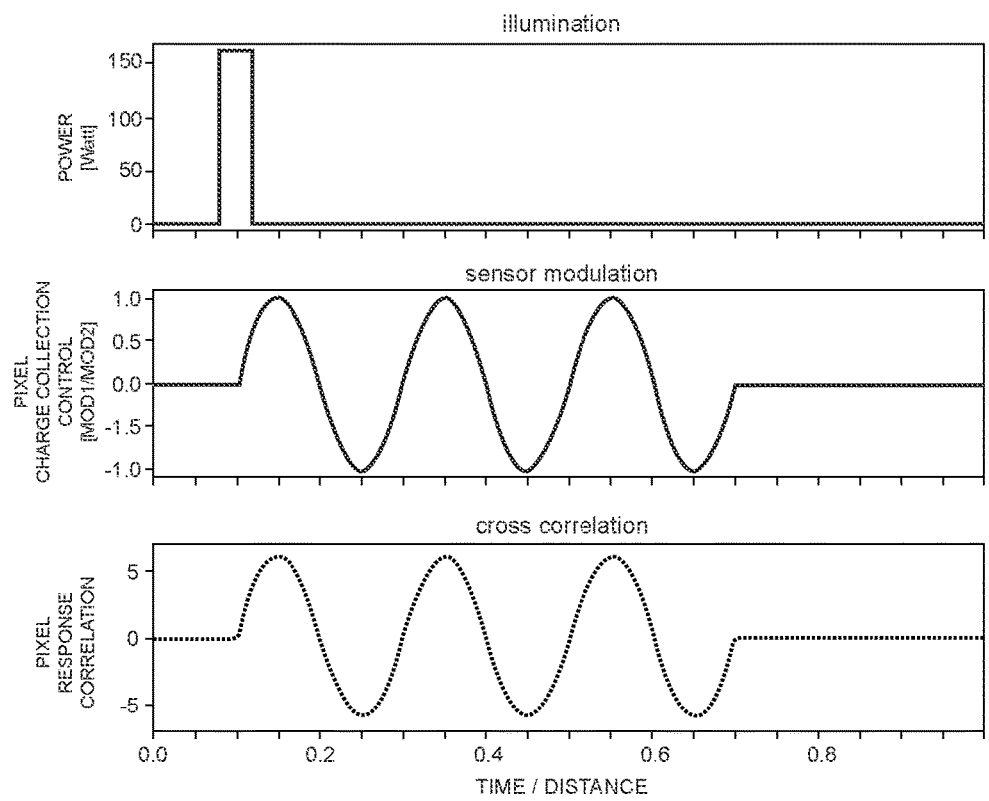
FIG. 8 is a diagram of illustrative illumination characteristics having a single high peak power pulse with low duty cycle, illustrative sensor modulation characteristics exhibiting selective sensor modulation suppression, and illustrative cross-correlation characteristics in accordance with some embodiments.

As an illustrative example, FIG. 8 shows a sensor modulation signal that is selectively suppressed when used in combination with an illumination signal exhibiting a single pulse (as described above in connection with FIG. 7). The illumination signal of FIG. 8 may have the same characteristics as the illumination signal of FIG. 7 (e.g., employing a single strong narrow width pulse for each TOF sensing operation). As shown in FIG. 8, the sensor modulation signal in the middle plot may begin with the pulse of the illumination signal in the top plot. However, after three cycles (e.g., corresponding to a distance of interest or a desired time for light emission and reflection), the sensor modulation signal may be suppressed or stopped.

In other words, (based on the examples described in connection with FIGS. 3 and 4) during the three cycles of the sensor modulation signal, driver circuitry 84 receiving the sensor modulation signal may generate control signals MOD1 and MOD2 (e.g., alternatingly assert control signals MOD1 and MOD2 periodically) in pixel 22 to store and integrate the corresponding charge portions. After the three cycles of the sensor modulation signal, driver circuitry 84 may stop generating (e.g., deassert) both control signals MOD1 and MOD2 that were previously generated based on the sensor modulation signal. Consequently, no further charge is added to the corresponding charge portions (e.g., stored at storage regions 46 and 56 in pixel 22 in FIG. 3). Accordingly, the cross-correlation data in FIG. 8 shows the effects the corresponding sensor modulation suppression on the pixel response. The illustrative TOF sensing system employing the illumination signal configuration and selective sensor modulation suppression of FIG. 8 may provide aliasing rejection and ambient light rejection.

Various embodiments have been described illustrating systems and methods for indirect time-of-flight (TOF) sensing using a system employing reduced duty cycle illumination.

As an example, a time-of-flight sensing system may include an illumination source, pixels, driver circuitry (e.g., in row control circuitry or pixel control circuitry) coupled to the pixels, and processing circuitry.

The illumination source may be configured to emit an illumination signal (e.g., a light signal) having a plurality of pulses each for a corresponding time-of-flight sensing operation. If desired, the illumination signal may have a duty cycle of less than 20 percent. If desired, the plurality of pulses may be periodic, and the illumination signal may have a pulse frequency associated with the periodicity.

The pixels may be configured to receive reflected light resulting from an emitted light pulse and to generate charge in response to the received light during a time-of-flight sensing operation. If desired, each of the pixels may include a photosensitive element coupled to first and second charge storage region via first and second transistors, respectively. The first and second transistors for the given pixel may be coupled to a floating diffusion region and pixel readout circuitry (e.g., a source follower transistor and a row select transistor).

The driver circuitry may be configured to control the pixels based on a sensor modulation signal having a modulation frequency during the time-of-flight sensing operation. The pulse frequency may be less than the modulation frequency. If desired, the driver circuitry may provide first and second corresponding control signals to the first and second transistors for at least a given pixel based on the sensor modulation signal. The first and second transistors for the given pixel may be alternatively activated by the first and second corresponding control signals to store the generated charge in first and second portions at the first and second charge storage regions, respectively, during the time-of-flight sensing operation. The given pixel may be configured to perform separate readout operations for each of the first and second portions of the generated charge.

The processing circuitry may be configured to generate cross-correlation data based on the generated charge at the pixels to identify time-of-flight information (e.g., depth or distance information for one or more objects in a scene).

If desired, the sensor modulation signal may be used to control the pixels during a first time period in the time-of-flight operation, and pixel modulation may be suppressed during a second time period in the time-of-flight sensing operation. The pixels may be modulated to store different portions of the generated charge at corresponding charge storage regions in each pixel during the first time period, and pixel modulation may be suppressed by stopping an integration of additional charge at the corresponding charge storage regions in each pixel during the second time period. The first time period may be associated with distances within a target distance of interest, and the second time period may be associated with distances outside of the target distance of interest.

As another example, a method for indirect time-of-flight sensing operations may include: emitting a light signal exhibiting light pulses at a pulse frequency, receiving a reflected light signal resulting from the emitted light signal at sensor module, performing sensor modulation for the sensor module using a modulation frequency to generate sensor data based on the reflected light signal, wherein the pulse frequency is less than the modulation frequency, after performing the sensor modulation for a time period associated with a distance of interest, stopping the sensor modulation, and determining time-of-flight information based on cross-correlation data obtained from the sensor data.

If desired, performing the sensor modulation may include, for each active pixel in the sensor module, storing different portions of charge at corresponding charge storage regions in each active pixel and separately reading out each of the different portions of charge from each active pixel. If desired, stopping the sensor modulation comprises, for each active pixel in the sensor module, stopping the integration of additional charge at the corresponding charge regions in each active pixel.

As yet another example, an indirect time-of-flight sensor may include: an illumination module configured to emit a light signal having one illumination pulse for each time-of-flight sensing operation, and a sensor module configured to receive a reflected light signal based on a reflected version of the emitted light signal, to perform signal modulation based on a modulation frequency to generate charge in response to the received light signal for a given time-of-flight sensing operation, and to suppress sensor modulation for the given time-of flight sensing operation based on a distance of interest within which time-of-flight information is determined. The sensor module may be configured to perform ambient light rejection and aliasing rejection when suppressing the sensor modulation.

The foregoing is merely illustrative of the principles of this invention and various modifications can be made by those skilled in the art without departing from the scope and spirit of the invention. The foregoing embodiments may be implemented individually or in any combination.

What is claimed is:

1. A time-of-flight sensing system comprising:
   an illumination source configured to emit a light pulse for a time-of-flight sensing operation;
   pixels configured to receive reflected light resulting from the emitted light pulse and to generate charge in response to the reflected light during the time-of-flight sensing operation;
   driver circuitry configured to control the pixels based on a sensor modulation signal having a modulation frequency during the time-of-flight sensing operation, wherein the illumination source is configured to emit additional light pulses, and the light pulse and the additional light pulses occur at a frequency less than the modulation frequency; and
   processing circuitry configured to generate cross-correlation data based on the generated charge to identify time-of-flight information.

2. The time-of-flight sensing system defined in claim 1, wherein each of the pixels includes a photosensitive element coupled to first and second charge storage region via first and second transistors, respectively.

3. The time-of-flight sensing system defined in claim 2, wherein the driver circuitry provides first and second corresponding control signals to the first and second transistors for at least a given pixel based on the sensor modulation signal.

4. The time-of-flight sensing system defined in claim 3, wherein the first and second transistors for the given pixel are alternatively activated by the first and second corresponding control signals to store the generated charge in first and second portions at the first and second charge storage regions, respectively, during the time-of-flight sensing operation.

5. The time-of-flight sensing system defined in claim 4, wherein the first and second transistors for the given pixel are coupled to a floating diffusion region and pixel readout circuitry, and wherein the given pixel is configured to perform separate readout operations for each of the first and second portions of the generated charge.

6. The time-of-flight sensing system defined in claim 1, wherein the light pulse and the additional light pulses form an illumination signal having a duty cycle of less than 20 percent.

7. The time-of-flight sensing system defined in claim 1, wherein each of the additional light pulses is associated with a corresponding additional time-of-flight sensing operation.

8. The time-of-flight sensing system defined in claim 1, wherein the sensor modulation signal is used to control the pixels during a first time period in the time-of-flight sensing operation and pixel modulation is suppressed during a second time period in the time-of-flight sensing operation.

9. The time-of-flight sensing system defined in claim 8, wherein the pixels are modulated to store different portions of the generated charge at corresponding charge storage regions in each pixel during the first time period, and wherein pixel modulation is suppressed by stopping an integration of additional charge at the corresponding charge storage regions in each pixel during the second time period.

10. The time-of-flight sensing system defined in claim 8, wherein the first time period is associated with distances within a target distance of interest, and the second time period is associated with distances outside of the target distance of interest.

11. A method for indirect time-of-flight sensing operations comprising:
    emitting a light signal exhibiting light pulses at a pulse frequency;
    receiving a reflected light signal resulting from the emitted light signal at sensor module;
    performing sensor modulation for the sensor module using a modulation frequency to generate sensor data based on the reflected light signal, wherein the pulse frequency is less than the modulation frequency; and
    determining time-of-flight information based on cross-correlation data obtained from the sensor data.

12. The method defined in claim 11, wherein performing the sensor modulation comprises, for each active pixel in the sensor module, storing different portions of charge at corresponding charge storage regions in each active pixel and separately reading out each of the different portions of charge from each active pixel.

13. The method defined in claim 12 further comprising:
    after performing the sensor modulation for a time period associated with a distance of interest, stopping the sensor modulation.

14. The method defined in claim 13, wherein stopping the sensor modulation comprises, for each active pixel in the sensor module, stopping an integration of additional charge at the corresponding charge storage regions in each active pixel.

15. The method defined in claim 11, wherein each light pulse in the light signal is associated with a corresponding time-of-flight sensing operation based on which corresponding time-of-flight information is determined.

16. The method defined in claim 11, wherein the light signal has a duty cycle of less than 20 percent.

17. An indirect time-of-flight sensor comprising:
    an illumination module configured to emit a light signal having one illumination pulse for each time-of-flight sensing operation; and
    a sensor module configured to receive a reflected light signal based on a reflected version of the emitted light signal, to perform signal modulation based on a modulation frequency to generate charge in response to the reflected light signal for a given time-of-flight sensing operation, and to suppress sensor modulation for the given time-of flight sensing operation based on a distance of interest within which time-of-flight information is determined.

18. The indirect time-of-flight sensor defined in claim 17, wherein the light signal has a pulse frequency that is less than the modulation frequency.

19. The indirect time-of-flight sensor defined in claim 17, wherein the sensor module is configured to perform ambient light rejection and aliasing rejection when suppressing the sensor modulation.

20. The time-of-flight sensing system defined in claim 1, wherein the light pulse and the additional light pulses each exhibit a same peak power that is based on providing a same total illumination for each of the time-of-flight sensing operation and additional time-of-flight sensing operations.

* * * * *